Patented Apr. 17, 1951

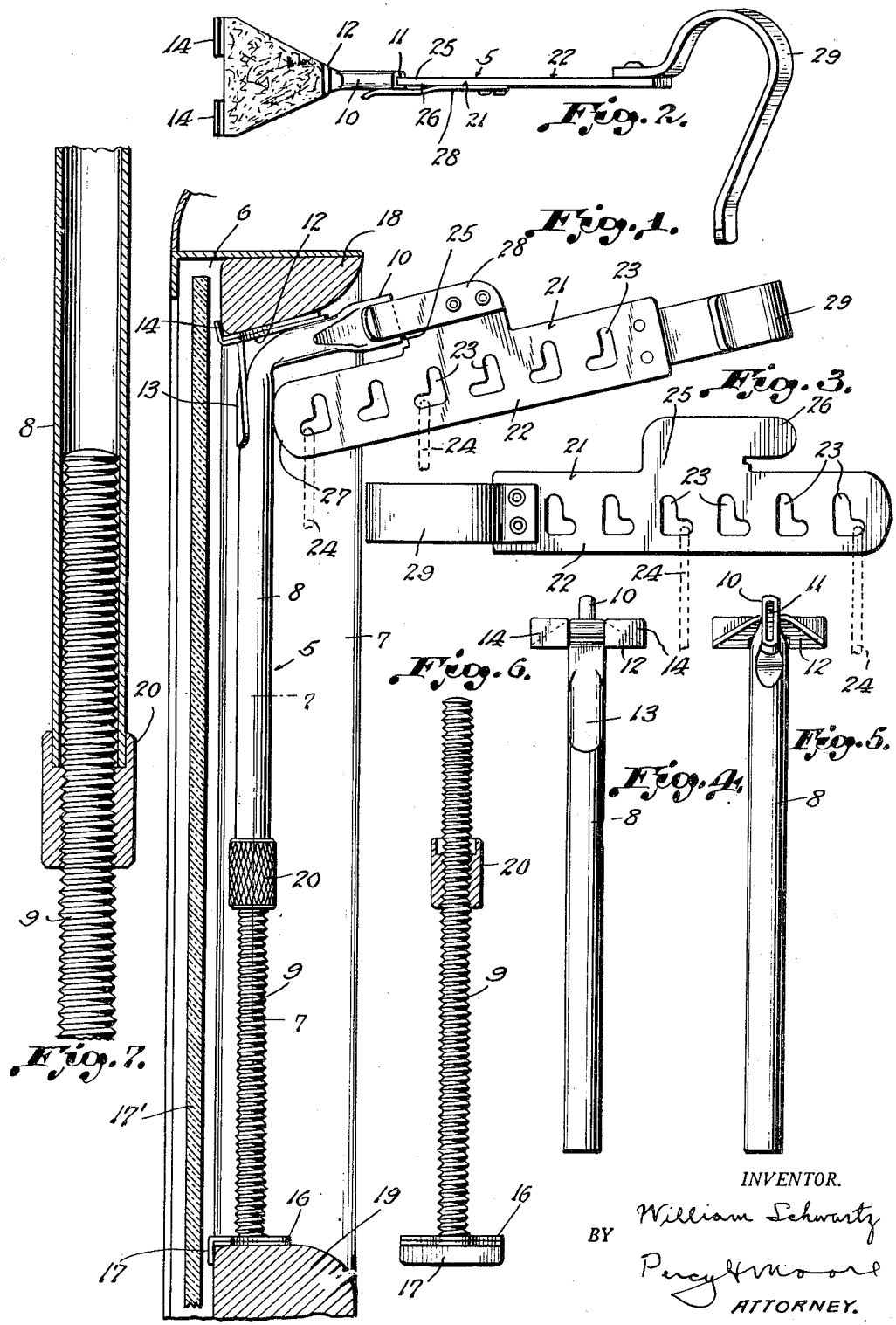

2,549,712

UNITED STATES PATENT OFFICE 2,549,712

AUTOMOBILE ATTACHABLE COAT HANGER SUPPORT

William Schwartz, Long Island City, N. Y., assignor to Sanjo Utility Manufacturing Co., New York, N. Y., a copartnership Application February 24, 1949, Serial No. 78,174

2 Claims. (Cl. 224—42.45)

This invention relates to coat hangers and supports therefor.

One of the objects of the invention is to provide an adjustable support whereby a coat hanger can be attached to the window opening of an automobile door or other window without interference with the opening or closing of the door window.

Another object of the invention is to provide a coat hanger which can be removably attached to the door or other window opening of an automobile whereby the hanger together with the garments hung thereon can be removed from the support without disturbing the open or closed position of the door window.

Still another object of the invention is to provide a coat hanger and support therefor which will permit of clothing being packed in an automobile while the door is either open or closed.

Still another object of the invention is to provide a coat hanger and support therefor which will permit of clothing being packed in an automobile or transferred therefrom to a clothes closet without disturbing the clothes.

Other objects and advantages will be apparent as the specification is considered in connection with the accompanying drawings, in which:

Figure 1 is a side elevation partly in section of the hanger and support mounted in a car door window;

Figure 2 is a top plan view of the hanger and support;

Figure 3 is a side view of the rack member;

Figure 4 is a rear view of the upper member of the hanger support;

Figure 5 is a front view of the upper member of the hanger support;

Figure 6 is a side view partly in section of the lower member of the hanger support; and Figure 7 is a section on the line 7—7 of Figure 1.

In the accompanying drawings wherein like numerals refer to corresponding parts throughout the several views, 5 denotes a two-part support member adapted to be inserted within the window opening 6 of an automobile door 7. The member 5 comprises an upper tubular sleeve portion 8 and a lower threaded cylindrical rod or post member 9, the upper end of which is loosely sleeved within the lower end of sleeve 8. The upper end of the sleeve 8 is bent at substantially right angles to the body thereof in an outwardly and slightly upwardly inclined direction to provide a substantially horizontally disposed extension 10, the extremity of the latter being pinched or contracted to provide an oblong entrance or opening 11 for a purpose presently described.

A plate or bracket 12 seats upon the horizontally disposed portion 10 of the sleeve 8 and is permanently secured to the latter, by welding or in any suitable manner. The plate 12 is formed with a downwardly extending tongue 13 which lies parallel to and is also welded or otherwise fixed to and braced by the body of the sleeve at a point below the extension 10. Two small spaced tabs or flanges 14 project upwardly on either side of the tubular sleeve 8. The cylindrical rod or post member 9 is screw threaded throughout its entire length, and fixed to its lower extremity, is a small flat horizontally disposed plate or bracket 16, one edge of which is bent downwardly to provide a flange 17, in substantially alinement with but oppositely disposed with respect to the two small flanges formed on the plate 12. These flanges 14 and 17 are adapted to be inserted respectively between the top and bottom frame members 18 and 19 of the door or window opening 6, and on the inside of the glass 17' and between the latter and the window frame. A lock nut 20, against which the lower end of the sleeve 8 is supported provides convenient means for clamping the plates 12 and 16 in tight contact with the top and bottom frame members 18 and 19. Of course it will be understood that the two-part support 5 can be quickly adjusted to fit within window openings of varying sizes.

A rack member 21, comprising a flat metal strip 22, is provided with a plurality of slots or openings 23 through which the hooked end of a conventional wire clothes hanger 24 can be conveniently inserted for an obvious purpose. The top edge of strip 22 projects upwardly intermediate its ends to provide an extension 25, in turn formed with an inwardly extending narrow flat oblong tongue 26, which is adapted to be snugly received and supported at its opposite sides within the oblong opening 11. As the width of the tongue 26 is slightly less than the width of the opening 11, the rack member 21 will be adequately supported in a substantially horizontal position. At the same time the horizontally disposed tongue 26 is free to rock or pivot slightly within the confines of the oblong opening 11, until the inner end 27 of the flat metal strip moves inwardly against the sleeve 8 with bracing effect. A flat spring 28 bolted to the extension 25 bears resiliently against one side of the horizontally bent portion of the sleeve 8 and assists in holding the rack in place, for ready removal from the two-part support 15.

When an automobilist has reached his destination the hotel attendant can readily remove the rack 21 from the support 5 by pulling the tongue 26 out of the opening 11, the outer end of the metal strip 22 terminating in a hook shaped portion 29 which facilitates this operation. The attendant can then carry the rack with hangers and clothing thereon into the hotel without the necessity of disturbing the rack support. The hook shaped member 29 also serves as a means for supporting the disconnected rack member from the conventional bar, not shown, and with which most clothes closets are provided. Of course, when so used the rack would necessarily be supported in vertical or depending position.

Having thus described my invention, what I claim is:

1. A garment hanger comprising a rack bar having openings for the attachment of conventional coat hangers therein, said rack-bar formed with an integral tongue spaced from certain of said openings, an upper tubular sleeve member and a lower rod member adjustably received in said sleeve, the remote ends of rod and said sleeve being formed with flanges adapted to engage between the frame and glass of an automobile window, means for clamping said flanges in place, said sleeve formed with a right-angled extension terminating at its upper end in a restricted opening, said opening adapted to telescopically receive for support therein said tongue with freedom of slight rocking movement, whereby said rack-bar will be supported in substantially horizontal position and the inner end of said rack-bar will be free to engage the sleeve with bracing effect.

2. A garment hanger comprising a rack bar having openings for the attachment of conventional coat hangers therein, said rack bar formed with an integral flat substantially straight tongue on its upper edge above and spaced from certain of said openings, said tongue extending parallel to the upper edge of said rack bar, an upper tubular vertically disposed sleeve member and a lower cylindrical rod member adjustably received in said sleeve, the remote ends of said rod and said sleeve being formed with oppositely disposed flanges adapted to engage between the frame and glass of an automobile window, means for clamping said flanges in place, said sleeve member formed with a right-angled extension terminating at its upper end in a restricted rectangular opening, said opening adapted to telescopically receive edgewise therein said tongue with freedom of slight rocking movement in said rectangular opening, whereby said rack bar will be supported in a substantially horizontal position and the inner end of said rack bar will be free to engage the vertical upper portion of said sleeve with bracing effect, and spring means on said tongue member adapted to bear resiliently against said right-angled extension to assist in holding the rack bar in place.

WILLIAM SCHWARTZ.

REFERENCES CITED

The following references are of record in the file of this patent:

UNITED STATES PATENTS

| Number | Name | Date |
|---|---|---|
| 1,068,250 | Koenig | July 22, 1913 |
| 2,461,722 | Coons | Feb. 15, 1949 |
| 2,514,790 | Ostrow | July 11, 1950 |